(12) United States Patent
Jung et al.

(10) Patent No.: US 9,784,911 B2
(45) Date of Patent: Oct. 10, 2017

(54) BACKLIGHT ASSEMBLY INCLUDING ALIGNMENT MEMBER AND DISPLAY DEVICE HAVING THE SAME

(71) Applicant: Samsung Display Co., Ltd., Yongin-si, Gyeonggi-do (KR)

(72) Inventors: Minsu Jung, Asan-si (KR); Byungchan Kim, Yongin-si (KR); Juhwan Kim, Seoul (KR); Cheolse Lee, Daegu (KR); Chunghui Lee, Cheongju-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 8 days.

(21) Appl. No.: 15/082,896

(22) Filed: Mar. 28, 2016

(65) Prior Publication Data

US 2016/0363724 A1   Dec. 15, 2016

(30) Foreign Application Priority Data

Jun. 15, 2015  (KR) .......................... 10-2015-0084129

(51) Int. Cl.
*F21V 8/00*  (2006.01)

(52) U.S. Cl.
CPC ............ *G02B 6/0091* (2013.01); *G02B 6/002* (2013.01); *G02B 6/0068* (2013.01)

(58) Field of Classification Search
CPC ........................... G02B 6/0091; G02B 6/0068
See application file for complete search history.

(56) References Cited

U.S. PATENT DOCUMENTS

| 8,696,182 B2 | 4/2014 | Choi |
| 2014/0133073 A1 | 5/2014 | Ahn et al. |

FOREIGN PATENT DOCUMENTS

| KR | 1020090056208 A | 6/2009 |
| KR | 1020130055338 A | 5/2013 |
| KR | 1020140060078 A | 5/2014 |
| KR | 1020140094849 A | 7/2014 |

*Primary Examiner* — Joseph L Williams
(74) *Attorney, Agent, or Firm* — Cantor Colburn LLP

(57) ABSTRACT

A display device includes: a display panel which display an image with light and has a curvature; a light source which generates and emits the light to the display panel; a light guide plate which guides the light emitted from the light source to the display panel, the light guide plate having a curvature and defining a light incidence surface thereof through which the light is incident; a circuit board which faces the light incidence surface of the light guide plate and on which the light source is mounted; and an alignment member which is between the circuit board and the light guide plate and aligns the light source with the light incidence surface of the light guide plate.

20 Claims, 7 Drawing Sheets

400:410,420,430,440,450,460

BACKLIGHT ASSEMBLY INCLUDING ALIGNMENT MEMBER AND DISPLAY DEVICE HAVING THE SAME

This application claims priority to Korean Patent Application No. 10-2015-0084129, filed on Jun. 15, 2015, and all the benefits accruing therefrom under 35 U.S.C. §119, the contents of which in their entirety are herein incorporated by reference.

BACKGROUND

1. Field

Exemplary embodiments of the invention relate to a display device for which light incidence efficiency of a light guide plate therein is improved.

2. Description of the Related Art

In general, flat panel display devices, such as a liquid crystal display ("LCD") device and an organic light emitting diode ("OLED") display device, include a plurality of pairs of electrodes which generate an electric field and an electro-optical active layer interposed therebetween. The LCD device includes a liquid crystal layer as the electro-optical active layer and the OLED display device includes an organic light emitting layer as the electro-optical active layer.

As the LCD device is used as a display device of television receivers, enlargement of a display screen in the LCD device is accelerated. However, as the display screen is enlarged, a viewing angle difference may disadvantageously increase between a case where a viewer observes the display screen at a center portion thereof and a case where the viewer observes the display screen at left and right end portions thereof. Herein, a viewing angle is defined as an angle between a sight line of a display screen viewer and a tangent line of a display screen which the display screen viewer observes, and the difference is defined as the above-described viewing angle difference.

In order to compensate for the viewing angle difference, the display device and the display screen thereof may be concavely or convexly curved into a curved form. The curved-type display device may be categorized into two types with respect to a viewer: a portrait type having a longer vertical length than a horizontal length and curved in a vertical direction; and a landscape type having a longer horizontal length than a vertical length and curved in a horizontal direction.

SUMMARY

One or more exemplary embodiments of the invention are directed to a display device of which light incidence efficiency of a light guide plate thereof is improved.

According to an exemplary embodiment of the invention, a display device includes: a display panel which displays an image with light and has a curvature; a light source which generates and emits the light to the display panel; a light guide plate which guides the light emitted from the light source to the display panel, the light guide plate having a curvature and defining a light incidence surface thereof through which the light is incident; a circuit board which faces the light incidence surface of the light guide plate and on which the light source is mounted; and an alignment member which is between the circuit board and the light guide plate and aligns the light source with the light incidence surface of the light guide plate. The alignment member extends from the circuit board and contacts an upper surface of the light guide plate.

The light source may be provided in plural and the alignment member may be disposed between adjacent light sources.

A position of the alignment member may be fixed with respect to the light incidence surface of the light guide plate by attachment of the alignment membered to at least one of the circuit board and the light guide plate.

In a direction from the circuit board to the light incidence surface of the light guide plate, a thickness of the alignment member may be greater than a thickness of the light source.

In a thickness direction of the light guide plate, a height of the light source may be substantially the same as a thickness of the light guide plate.

Within the display device, he light source may be coplanar with the light guide plate.

The display device may further include a lower frame on which the light source, the circuit board and the light guide plate are disposed.

According to an exemplary embodiment of the invention, a display device includes: a display panel which display an image with light and has a curvature; a light source which generates and emits the light to the display panel; a light guide plate which guides the light emitted from the light source to the display panel, the light guide plate having a curvature and defining a light incidence surface thereof through which the light is incident, and a coupling groove thereof recessed from the light incidence surface; a circuit board which faces the light incidence surface of the light guide plate and on which the light source is mounted; and an alignment member which is between the circuit board and the light guide plate and aligns the light source with respect to the light incidence surface of the light guide plate. The alignment member extends from the circuit board and into the coupling groove recessed from the light incidence surface of the light guide plate.

The light source may be provided in plural and the alignment member may be disposed between adjacent light sources.

A position of the alignment member with respect to the light incident surface of the light guide plate may be fixed by attachment of the alignment member to at least one of the circuit board and the light guide plate.

In a thickness direction of the light guide plate, a height of the light source may be substantially the same as a thickness of the light guide plate.

Within the display device, the light source may be disposed coplanar with the light guide plate.

The display device may further include a lower frame on which the light source, the circuit board and the light guide plate are disposed.

According to an exemplary embodiment of the invention, a display device includes: a display panel which displays an image with light and has a curvature; a light source which generates and emits the light to the display panel, the light source defining a first inclined surface thereof; a light guide plate which guides the light emitted from the light source to the display panel, the light guide plate having a curvature and defining a light incidence surface thereof through which the light is incident and from which a portion thereof extends toward the light source, the extended portion defining a second inclined surface of the light guide plate; a circuit board which faces the light incidence surface of the light guide plate and on which the light source is mounted; and an alignment member which is between the circuit board and the light guide plate and aligns the light source with the light incidence surface of the light guide plate. The first inclined surface defined by the light source and the second inclined surface defined by the light guide plate face each other to define the alignment member.

In a thickness direction of the light guide plate, the first inclined surface may be disposed on the second inclined surface.

The first inclined surface disposed on the second inclined surface may contact the second inclined surface.

In a thickness direction of the light guide plate, a height of the light source may be substantially the same as a thickness of the light guide plate.

Within the display device, the light source may be coplanar with the light guide plate.

The display device may further include a lower frame on which the light source, the circuit board and the light guide plate are disposed.

The circuit board may have a curvature and a length of the circuit board may be disposed along a curved side of the light guide plate.

The foregoing is illustrative only and is not intended to be in any way limiting. In addition to the illustrative embodiments and features described above, further embodiments and features will become apparent by reference to the drawings and the following detailed description.

BRIEF DESCRIPTION OF THE DRAWINGS

The above and other features of the present disclosure of invention will be more clearly understood from the following detailed description taken in conjunction with the accompanying drawings, in which.

DETAILED DESCRIPTION

Figure 1:
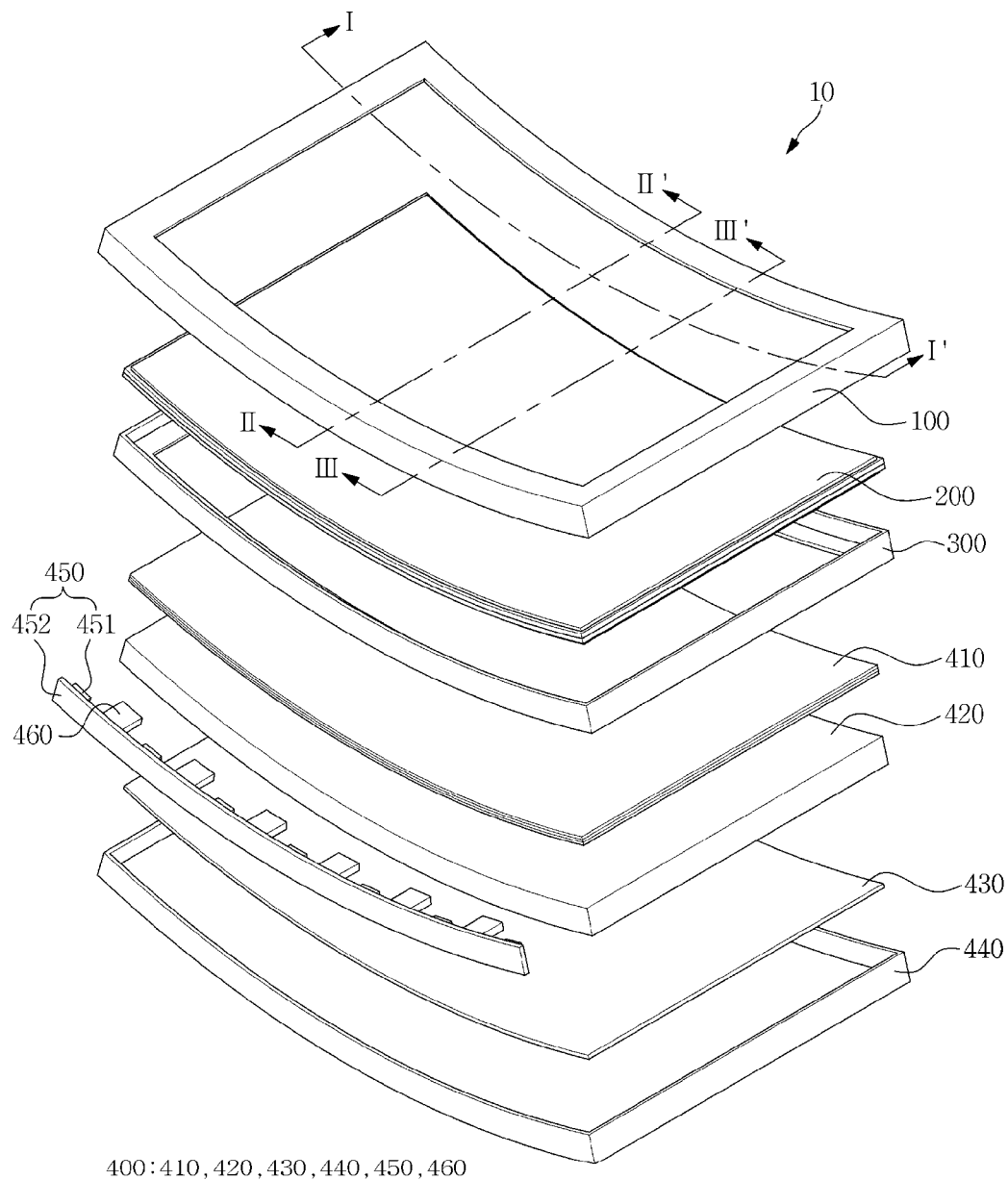
FIG. 1 is a schematic exploded perspective view illustrating an exemplary embodiment of a display device according to the invention.

Advantages and features of the invention and methods for achieving them will be made clear from exemplary embodiments described below in detail with reference to the accompanying drawings. The invention may, however, be embodied in many different forms and should not be construed as being limited to the exemplary embodiments set forth herein. Rather, these exemplary embodiments are provided so that this disclosure will be thorough and complete, and will fully convey the scope of the invention to those skilled in the art. The invention is merely defined by the scope of the claims. Therefore, well-known constituent elements, operations and techniques are not described in detail in the exemplary embodiments in order to prevent the invention from being obscurely interpreted. Like reference numerals refer to like elements throughout the specification.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The spatially relative terms "below," "beneath," "lower," "above," "upper" and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" includes both the lower and upper positions. The device may also be oriented in the other direction, and thus the spatially relative terms may be interpreted differently depending on the orientations.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms used herein (including technical and scientific terms) have the same meaning as commonly understood by those skilled in the art. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A backlight unit provided in a curved-type display device includes a curved light guide plate disposed therein. Where a light source unit of the backlight unit is provided along a side surface of the curved light guide plate, aligning respective light sources of the light source unit to face a light incidence side surface of the curved light guide plate may be difficult. Accordingly, light incidence efficiency in terms of light incident to the curved light guide plate with respect to light emitted from the light source unit may decrease, thus undesirably leading to a decrease in luminance.

Hereinafter, an exemplary embodiment of a display device according to the invention will be described with reference to FIGS. 1 and 2.

Figure 2:
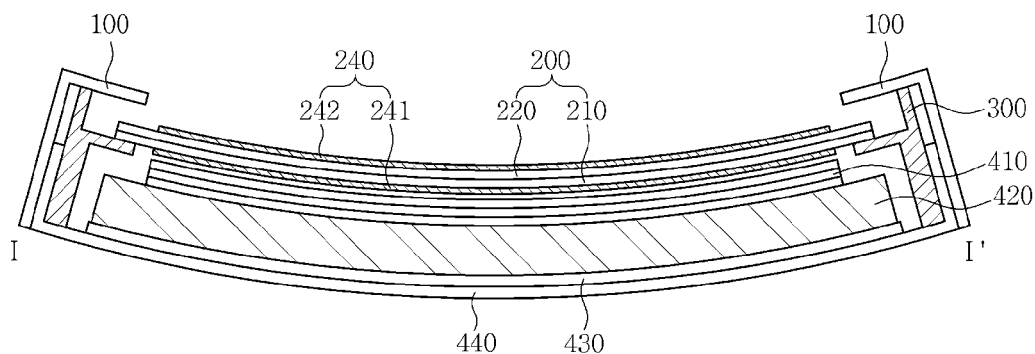
FIG. 2 is a schematic cross-sectional view taken along line I-I' of FIG. 1.

FIG. 1 is a schematic exploded perspective view illustrating an exemplary embodiment of a display device 10 according to the invention and FIG. 2 is a schematic cross-sectional view taken along line I-I' of FIG. 1.

In reference to FIGS. 1 and 2, the display device 10 has a predetermined radius of curvature. That is, the display device 10 is a curved-type display device where both sides (e.g., upper and lower sides) of a display panel 200 are roundly curved with respect to a center portion thereof.

The display device 10 includes the display panel 200, a backlight assembly 400 configured to supply light to the display panel 200, an upper frame 100 provided in a shape to cover a portion of the display panel 200, and an intermediate frame 300 on which the display panel 200 is mounted. The above-listed elements are roundly curved corresponding to the shape of a curved surface the display device 10.

The upper frame 100 is coupled to a lower frame 440 of the backlight assembly 400 so as to partially cover the display panel 200 mounted on the intermediate frame 300. The upper frame 100 has an opening defined therein at a center portion thereof to expose the display panel 200. The upper frame 100 may be disposed to cover an edge portion of an upper surface and cover side surfaces of the display panel 200.

The upper frame 100 may be coupled to the lower frame 440 by hooks and/or screws but is not limited thereto. Further, the coupling of the upper frame 100 and the lower frame 440 may be modified into various structures. The coupling structure of the upper frame 100 and the lower frame 440 will be described hereinbelow.

The display panel 200 has a predetermined radius of curvature. The display panel 200 has two relatively long sides (hereinafter, "long sides") that are concavely curved having a predetermined curvature and two relatively short sides (hereinafter, "short sides") that are straight. In an alternative exemplary embodiment, the short sides of the display panel 200 may be concavely curved, and the long sides thereof may be straight.

The display panel 200 may include or be formed of a flexible material. The display panel 200 which is initially non-curved (e.g., flat) may be curved after being disposed within the lower frame 440, the intermediate frame 300 and the upper frame 100. That is, the lower frame 440, the intermediate frame 300 and the upper frame 100 fix the display panel 200 so that the display panel 200 has a predetermined radius of curvature. Accordingly, the lower frame 440, the intermediate frame 300 and the upper frame 100 have a predetermined radius of curvature to have a shape similar to the shape of the display panel 200.

The display panel 200 may be curved in various manners. In an exemplary embodiment, for example, relative to the display panel 200 in FIGS. 1 and 2, if a direction of displaying an image is defined as an upper direction and the opposite direction is defined as a lower direction, the display panel 200 may be convexly curved in the upper direction or the lower direction. However, the curved direction of the display panel 200 may not be limited thereto. In some exemplary embodiments, a center portion of the display panel 200 may be convexly curved in the upper direction, that is, convexly curved toward a user or viewer. In some exemplary embodiments, a portion of the display panel 200 may be convexly curved in the upper direction and another portion thereof may be convexly curved in the lower direction.

The display panel 200 is configured to display an image. The display panel 200 is a light-receiving type display panel and may include a liquid crystal display ("LCD") panel, an electrowetting display panel, an electrophoretic display panel, a microelectromechanical system ("MEMS") display panel, and the like. In an exemplary embodiment of the invention, the LCD panel will be described by way of example.

The display panel 200 includes a first display substrate 210, a second display substrate 220 opposing the first display substrate 210, and a liquid crystal layer (not illustrated) interposed between the first display substrate 210 and the second display substrate 220. The display panel 200, when viewed from a top plan view, has a display area on which an image is displayed and a non-display area which surrounds a display area and on which an image is not displayed. The non-display area may be covered by the upper frame 100.

The first display substrate 210 includes a plurality of pixel electrodes (not illustrated) and a plurality of thin film transistors (not illustrated) electrically connected to the plurality of pixel electrodes in one-to-one correspondence, on a first base substrate. The thin film transistors may each function as a switch of a driving signal applied to the corresponding pixel electrode. Further, the second display substrate 220 may include a common electrode (not illustrated) that forms an electric field controlling an alignment of liquid crystals along with the pixel electrodes, on a second base substrate. The display panel 200 may be configured to drive the liquid crystal layer to display an image frontwards (e.g., in the upper direction).

The display panel 200 includes a driving chip (not illustrated) configured to supply a driving signal, a tape carrier package ("TCP") on which the driving chip is mounted, and a printed circuit board (not illustrated) electrically connected to the display panel 200 through the TCP. The driving chip generates a driving signal to drive the display panel 200 in response to an external signal. The external signal refers to a signal supplied from a printed circuit board and may include an image signal, various control signals, and a driving voltage.

A polarizer 240 is disposed on the display panel 200, and collectively includes a first polarizer 241 and a second polarizer 242. The first polarizer 241 and the second polarizer 242 are disposed on surfaces of the first and second display substrates 210 and 220 that are opposite to surfaces of the first and second display substrates 210 and 220 facing one another, respectively. That is, the first polarizer 241 may be attached to an outer side of the first display substrate 210 and the second polarizer 242 may be attached to an outer side of the second display substrate 220. A transmissive axis of the first polarizer 241 may be substantially perpendicular with respect to a transmissive axis of the second polarizer 242.

The intermediate frame 300 is coupled to the lower frame 440 and accommodates the display panel 200 therein. The intermediate frame 300 may include or be formed of a flexible material, such as plastic, in order to reduce or effectively prevent damage to the display panel 200. However, the material forming the intermediate frame 300 is not limited thereto, and the intermediate frame 300 may include or be formed of another material while having the same above-described shape and function.

The intermediate frame 300 is provided along an edge of the display panel 200 and supports the display panel 200 from therebelow. The intermediate frame 300 may be provided in positions corresponding to four sides or at least one of the four sides of the display panel 200. In an exemplary embodiment, for example, the intermediate frame 300 may have a quadrilateral loop shape corresponding to the four sides of the display panel 200, or alternatively may have a '[' shape in the top plan view corresponding to three sides of the edge of the display panel 200. The intermediate frame 300 may be integrally formed as a single unit, but may be collectively formed by a plurality of separate units that are assembled together to form the intermediate frame 300, where necessary.

The intermediate frame 300 may be further coupled to the upper frame 100. In an exemplary embodiment, for example, coupling holes may be respectively defined in the upper frame 100, the lower frame 440 and the intermediate frame 300, and the coupling holes may be aligned with each other. The upper frame 100, the lower frame 440 and the intermediate frame 300 may be coupled to one another simultaneously by a coupling member extended through each of the above-described coupling holes. The coupling member may be a screw, but is not limited thereto.

The backlight assembly 400 includes an optical sheet 410, a light guide plate 420, a reflective sheet 430, the lower frame 440, a light source unit 450 and an alignment member 460.

The light source unit 450 includes a light source 451 and a circuit board 452 on which the light source 451 is disposed. The light source unit 450 may be disposed at an edge portion or a light incidence side surface of the light guide plate 420. That is, the light source unit 450 may generate and emit light toward the edge portion or the light incidence side surface of the light guide plate 420.

The light source 451 may include a light emitting diode ("LED") and the like. The light source 451 may be provided in plural on the circuit board 452 to provide light for the display device 10 which displays image information by using the provided light. The light emitted from the light source 451 is guided toward the display panel 200 through the light guide plate 420 and the optical sheet 410. The plural light sources 451 may be spaced apart from each other at a uniform interval along a length of the circuit board 452 so as to achieve uniformity in luminance of the light source unit 450.

The circuit board 452 may be roundly curved. The circuit board 452 has a quadrangular planar shape and has a reflective surface. In an exemplary embodiment, for example, a surface of the circuit board 452 body may be treated with a reflective material. Further, the circuit board 452 body may include or be made of a metal material to perform functions of heat dissipation. In this regard, any of a number of metal materials may be used without limitation and various metal materials having relatively high thermal conductivity may be used.

The light source unit 450 may be disposed correspond to one side surface, two side surfaces, or each of the four side surfaces of the light guide plate 420 or at least at one of the edge portions of the light guide plate 420, in consideration of the size and luminance uniformity of the display panel 200.

The light guide plate 420 is disposed adjacent to the light source unit 450 and accommodated in the lower frame 440. As illustrated in FIGS. 1 and 2, the light guide plate 420 may have a roundly-curved polyhedral shape. The light guide plate 420 may include or be formed of a flexible material as in the display panel 200. That is, the light guide plate 420 may be initially provided in a flat shape and then transformed into a curved shape after being assembled within the display device 10. Alternatively, the light guide plate 420 may be initially provided in a curved shape and may be rigid absent flexibility without being assembled within the display device 10.

The light guide plate 420 defines a light emission surface thereof, a rear surface thereof opposing the light emitting surface, and the four side surfaces thereof which connect the light emitting surface to the rear surface. The light guide plate 420 is configured to receive the light emitted from the light source 451 through a light incidence side surface and to emit the light toward the light emission surface. The light guide plate 420 provides the light directed from the light source unit 450 to the display panel 200 uniformly.

Although the light guide plate 420 is described as a plate such as having a relatively large cross-sectional thickness for ease of description, the light guide plate 420 may have a shape of a sheet or a film for which the cross-sectional thickness is smaller than that of the plate and is relatively small as compared to the planar size thereof so as to achieve slimness of the display device 10. That is, the light guide plate 420 is to be understood as having a concept that includes not only a plate but also a film which guides light provided from the light source unit 450.

The light guide plate 420 may include or be formed of a light-transmissive material including, for example, acrylic resins, such as polymethylmethacrylate ("PMMA"), or polycarbonate ("PC") so as to guide light efficiently.

A pattern may be defined in or on at least one surface of the light guide plate 420. In an exemplary embodiment, for example, a scattering pattern (not illustrated) may be disposed or formed on a lower surface of the light guide plate 420, so as to scatter and/or reflect the guided light upwards toward the display panel 200.

The optical sheet 410 is disposed above the light guide plate 420 and configured to diffuse and/or collimate light directed from the light guide plate 420. The optical sheet 410 may have a roundly curved shape. The optical sheet 410 may include or be formed of a flexible material as in the display panel 200. That is, the optical sheet 410 may be initially provided in a flat shape and then transformed into a curved shape after being assembled within the display device 10. Alternatively, the optical sheet 410 may be initially provided in a curved shape and may be rigid absent flexibility without being assembled within the display device 10.

The optical sheet 410 may collectively include a diffusion sheet, a prism sheet, a passivation sheet and/or other functional sheets.

The diffusion sheet is configured to disperse light guided from the light guide plate 420 to thereby reduce or effectively prevent the light from being partly concentrated.

The prism sheet includes prisms having a triangular cross-section and arranged in a predetermined array at one surface thereof. The prism sheet may be disposed on the diffusion sheet and may collimate light diffused from the diffusion sheet in a direction perpendicular to the display panel 200.

The passivation sheet may be disposed on the prism sheet and may serve to protect a surface of the prism sheet and diffuse light to achieve uniform light distribution.

The reflective sheet 430 is disposed between the light guide plate 420 and the lower frame 440 and reflects light emitted downwards from the light guide plate 420 to be re-directed toward the display panel 200, thereby improving light efficiency. The reflective sheet 430 may have a roundly curved shape.

The reflective sheet 430 may include, for example, polyethylene terephthalate ("PET"), to have reflectivity. One surface of the reflective sheet 430 body may be coated with a diffusion layer including, for example, titanium dioxide.

In some embodiments, the reflective sheet 430 body may include or be formed of a material containing metal, such as silver (Ag).

The lower frame 440 accommodates the light source unit 450, the optical sheet 410, the reflective sheet 430 and the light guide plate 420 therein. The lower frame 440 may have a roundly curved shape.

The lower frame 440 includes a rigid metal material, such as stainless steel, or a material having good heat dissipation properties, such as aluminum or an aluminum alloy. According to the exemplary embodiment, the lower frame 440 is responsible for maintaining an overall framework of the display device 10 and protecting a variety of components accommodated therein.

In the display device 10 of a curved type described in the foregoing, the alignment member 460 is provided so as to enhance light incidence efficiency of the light guide plate 420. Hereinafter, the alignment member 460, the light source unit 450 and the light guide plate 420 will be described further with reference to FIGS. 3, 4 and 5.

Figure 3:
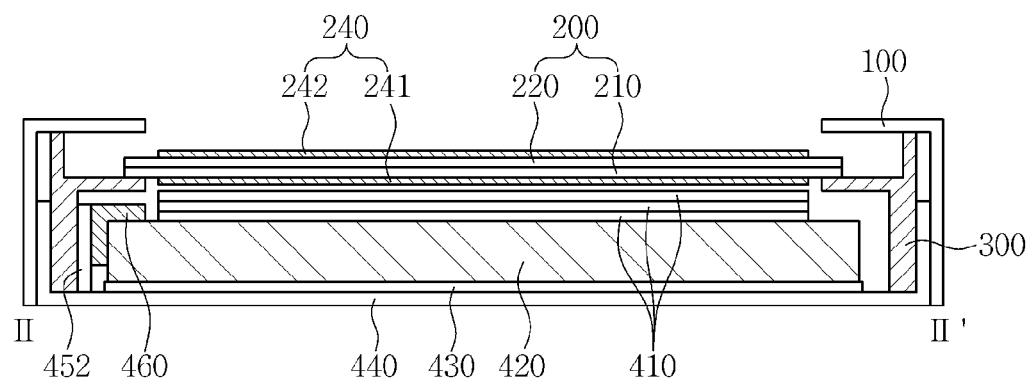
FIG. 3 is a schematic cross-sectional view taken along line II-II' of FIG. 1.
Figure 4:
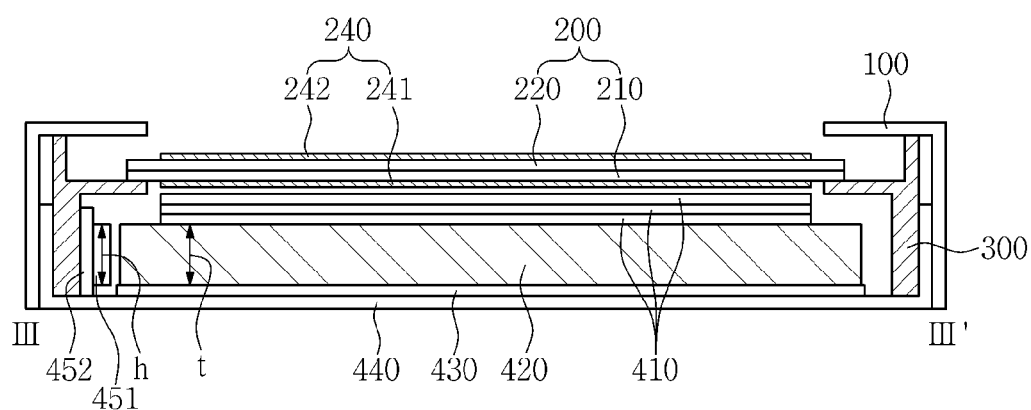
FIG. 4 is a schematic cross-sectional view taken along line III-III' of FIG. 1.
Figure 5:
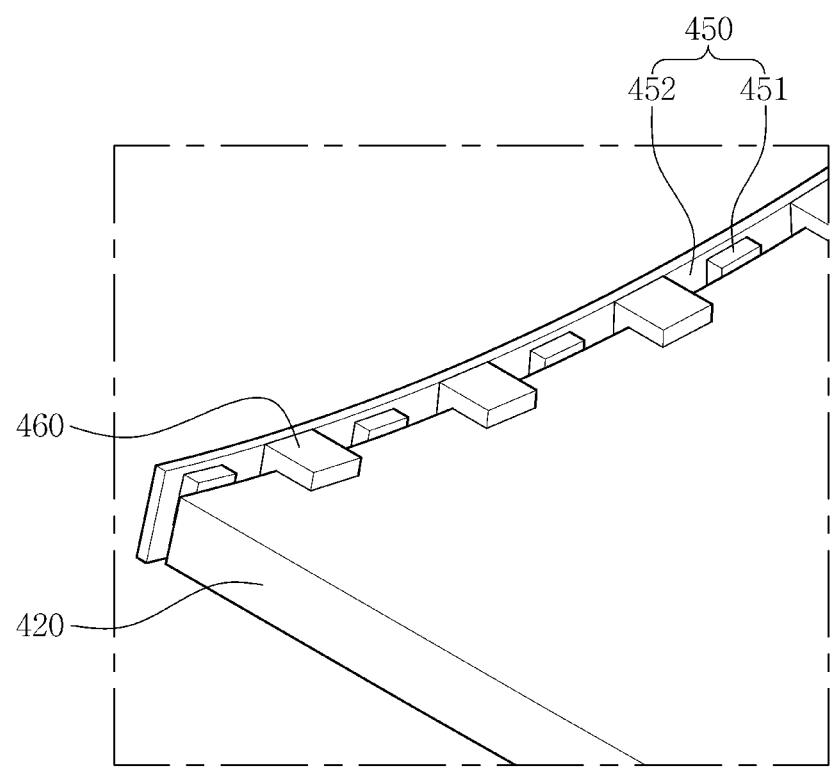
FIG. 5 is a partial enlarged view schematically illustrating an exemplary embodiment of a light guide plate, a light source unit and an alignment member of FIG. 1.

FIG. 3 is a schematic cross-sectional view taken along line II-II' of FIG. 1. FIG. 4 is a schematic cross-sectional view taken along line III-III' of FIG. 1. FIG. 5 is a partial enlarged view schematically illustrating the light guide plate 420, the light source unit 450 and the alignment member 460 of FIG. 1.

In reference to FIGS. 3, 4 and 5, the light source 451 is mounted on the circuit board 452, and disposed facing a light incidence side surface of the light guide plate 420. The alignment member 460 is disposed between the circuit board 452 and the light guide plate 420, and aligns the light sources 451 in a predetermined manner with respect to the light incidence side surface of the light guide plate 420. The predetermined manner may include alignment in a thickness direction of the light guide plate 420 and/or along a length of the light incidence side surface of the light guide plate. In addition, the alignment member 460 overlaps and contacts an upper surface of the light guide plate 420. The light source 451 and the alignment member 460 may be provided in plural along the length of the circuit board 452 and along a length of the light incidence side surface of the light guide plate 420. The alignment member 460 is disposed between adjacent light sources 451. The light sources 451 and the alignment member 460 may alternate along the the length of the circuit board 452 and along the length of the light incidence side surface of the light guide plate 420.

Further, the alignment member 460 is attached to at least one of the circuit board 452 and the light guide plate 420. In one exemplary embodiment, for example, as being fixed to the circuit board 452 to contact the upper surface of the light guide plate 420, the alignment member 460 guides the light source 451 to face the light incidence side surface of the light guide plate 420. As being fixed to the light guide plate 420 to contact a surface of the circuit board 452, the alignment member 460 guides the light source 451 to face the light incidence side surface of the light guide plate 420.

The circuit board 452 has a curvature along a curved side of the light guide plate 420 as described in the foregoing. For example, in FIG. 1, the light guide plate 420 has two long sides having a curved shape, and the circuit board 452 has a curvature which is substantially constant along the length thereof disposed at a long side of the light guide plate 420.

As the circuit board 452 and the alignment member 460 are disposed in such a manner, the light incidence efficiency of the light guide plate 420 is increased. That is, as the alignment member 460 that is fixed to the circuit board 452 contacts the upper surface of the light guide plate 420, positions of the light source 451 and the light incidence side surface of the light guide plate 420 are aligned and maintained, and thus the light incidence efficiency of the light guide plate 420 may be enhanced. As the alignment member 460 that is fixed to the light guide plate 420 contacts the surface of the circuit board 452, positions of the light source 451 and the light incidence side surface of the light guide plate 420 are aligned and maintained, and thus the light incidence efficiency of the light guide plate 420 may be enhanced.

As illustrated in FIG. 4, a total height "h" of the light source 451 and a total thickness "t" of the light guide plate 420 may be substantially the same. In other words, the light source 451 and a light emitting surface thereof may be coplanar with the light guide plate 420.

Referring to FIGS. 3 and 5, the alignment member 460 includes a side portion extended along the surface of the circuit board 452 and an extended portion bent from the side portion to overlap the upper surface of the light guide plate 420. The extended portion terminates at a distal end thereof positioned further from the circuit board 452 than the light incidence side surface of the light guide plate 420. In a horizontal direction of FIG. 3, the alignment member 460 may have a thickness greater than that of the light source 451. Accordingly, with the greater thickness side portion of the alignment member 460 disposed between the circuit board 452 and the light guide plate 420, the smaller thickness light source 451 and the light guide plate 420 may be a predetermined distance spaced apart from each other.

As the light incidence efficiency of the light guide plate 420 is enhanced, a desired amount of light may be obtained with a smaller number of light sources 451 as compared to the number of light sources 451 previously required in a conventional display device to obtain the desired amount. Accordingly, in one or more exemplary embodiments of the invention, as the number of the light sources 451 is reduced, manufacturing costs of a display device may be reduced.

Hereinafter, another exemplary embodiment of a display device will be described with reference to FIGS. 6 and 7. For ease of description, descriptions with regard to configurations the same as those of the previous exemplary embodiment will be omitted.

Figure 6:
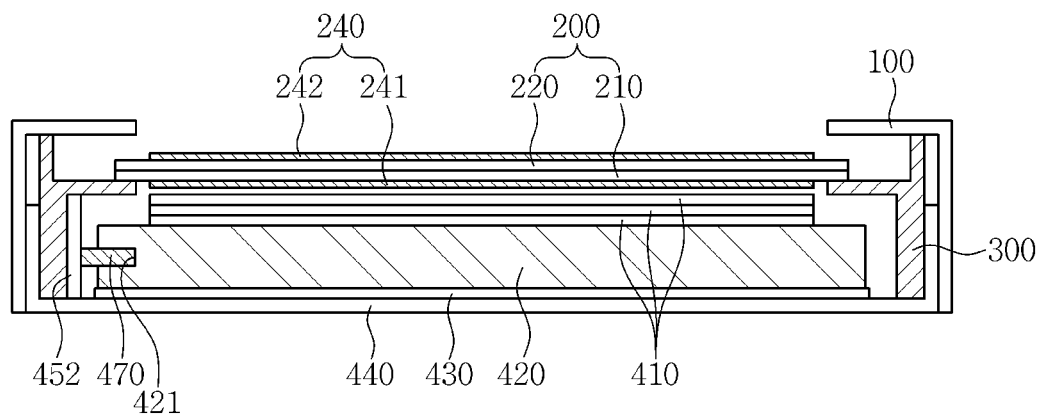
FIG. 6 is a schematic cross-sectional view illustrating another exemplary embodiment of a display device according to the invention.

FIG. 6 is a schematic cross-sectional view illustrating another exemplary embodiment of a display device according to the invention. FIG. 7 is a schematic perspective view illustrating a light guide plate 420, a light source unit 450 and an alignment member 470 of FIG. 6.

Figure 7:
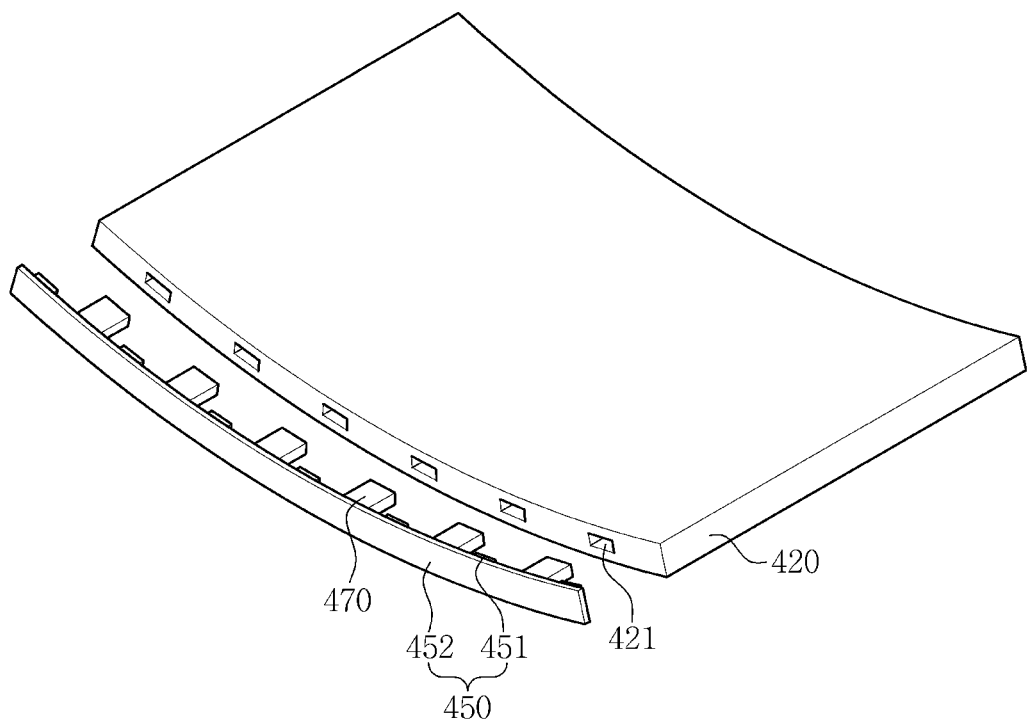
FIG. 7 is a schematic perspective view illustrating an exemplary embodiment of a light guide plate, a light source unit and an alignment member of FIG. 6.

In reference to FIGS. 6 and 7, the light guide plate 420 has a coupling groove 421 defined therein at a light incidence side surface thereof facing a circuit board 452. The coupling groove 421 is recessed from the light incidence side surface of the light guide plate 420. The alignment member 470 is disposed protruded from a surface of the circuit board 452 between adjacent light sources 451 arranged in a length direction of the circuit board 452 and a length direction of the light incidence side surface and is extended into the coupling groove 421. The alignment member 470 terminates at a distal end thereof positioned further from the circuit board 452 than the light incidence side surface of the light guide plate 420. The light guide plate 420 and the alignment member 470 are configured in such a manner to thereby align the light source 451 and the light guide plate 420.

In a horizontal direction of FIG. 6, the protruded alignment member 470 may have a length greater than a thickness of the light source 451. Accordingly, with the the protruded alignment member 470 disposed between the surface of the circuit board 452 and the light guide plate 420, the light source 451 and the light guide plate 420 may be a predetermined distance spaced apart from each other.

Hereinafter, still another exemplary embodiment of a display device will be described with reference to FIGS. 8, 9, 10, 11 and 12. For ease of description, descriptions with regard to configurations the same as those of the first exemplary embodiment will be omitted.

Figure 8:
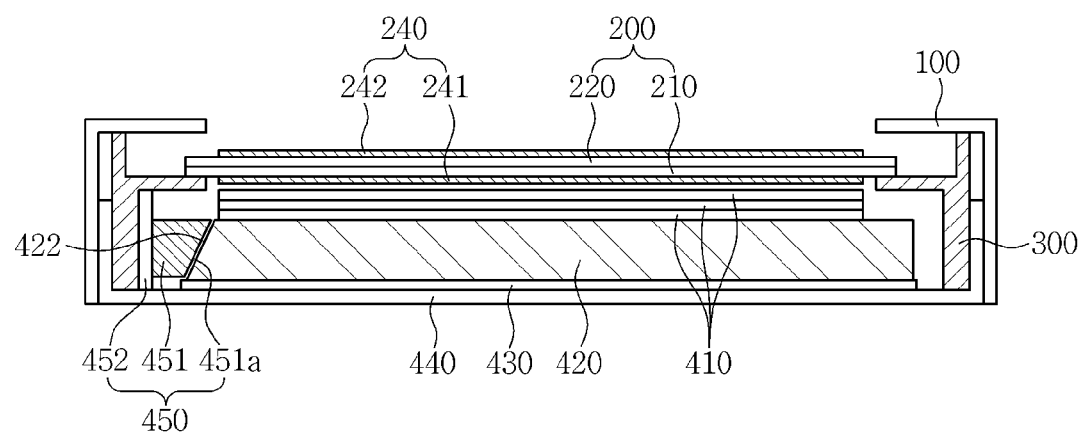
FIG. 8 is a schematic cross-sectional view illustrating still another exemplary embodiment of a display device according to the invention.
Figure 9:
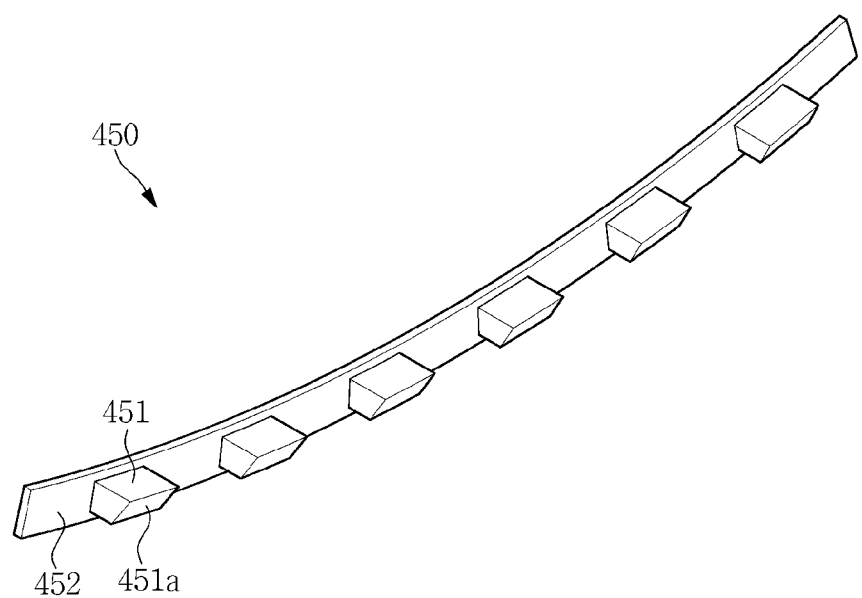
FIG. 9 is a schematic perspective view illustrating an exemplary embodiment of a light source unit of FIG. 8.
Figure 10:
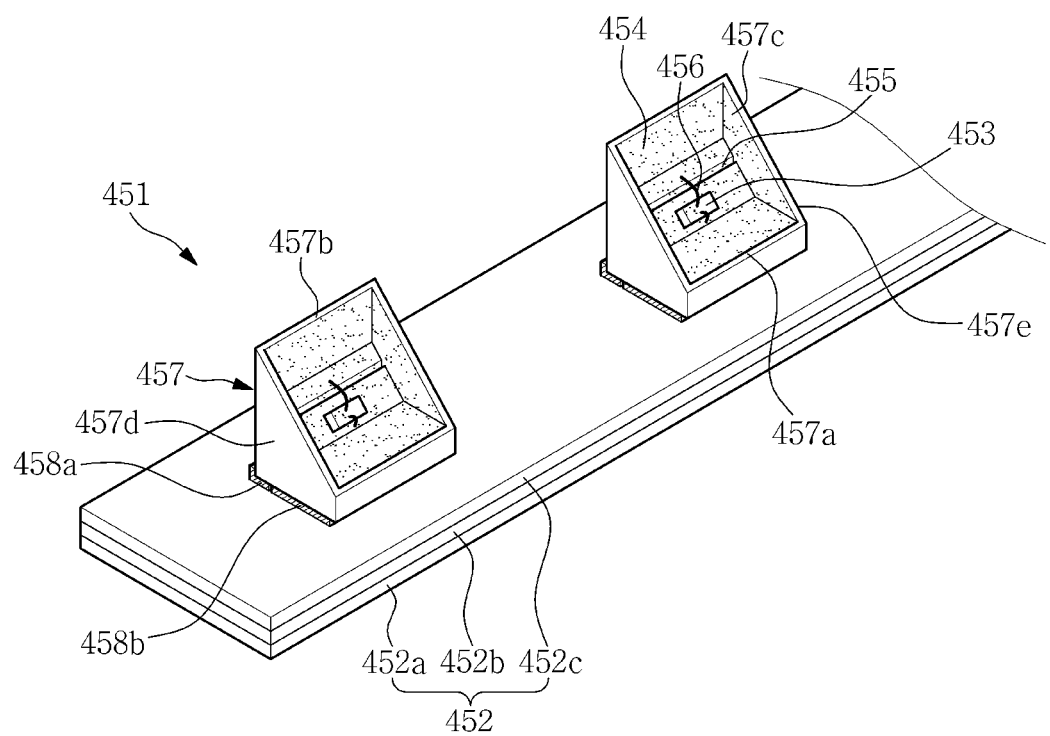
FIG. 10 is a partial enlarged view schematically illustrating the light source unit of FIG. 9.
Figure 11:
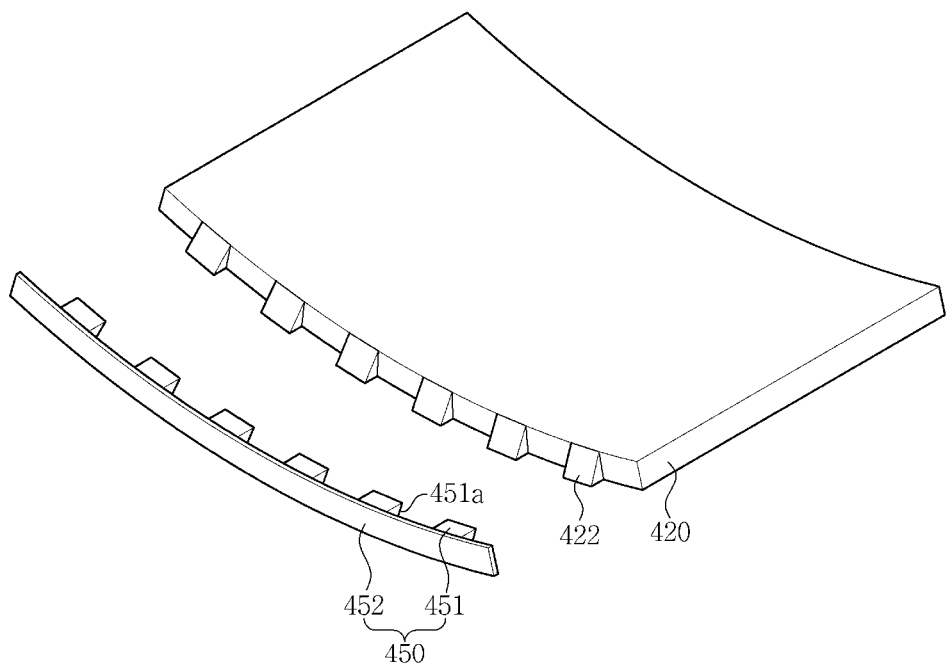
FIGS. 11 and 12 are schematic perspective views illustrating exemplary embodiments of the light source unit and a light guide plate of FIG. 8.
Figure 12:
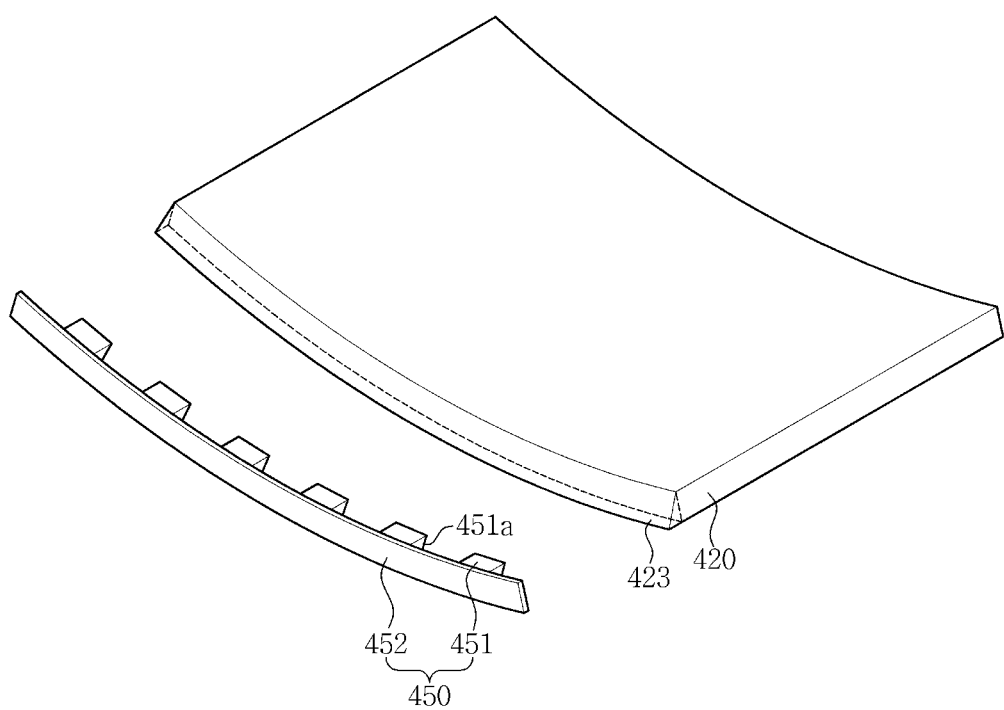

FIG. 8 is a schematic cross-sectional view illustrating still another exemplary embodiment of a display device according to the invention. FIG. 9 is a schematic perspective view illustrating an exemplary embodiment of a light source unit 450 of FIG. 8. FIG. 10 is a partial enlarged view schematically illustrating the light source unit 450 of FIG. 9. FIGS. 11 and 12 are schematic perspective views illustrating exemplary embodiments of the light source unit 450 and a light guide plate 420 of FIG. 8.

In reference to FIGS. 8, 9 and 10, a light source 451 has a first inclined surface 451*a* defined therein.

In detail, the light source unit 450 includes a plurality of light sources 451 each defining a triangular shape and a circuit board 452 on which the plurality of light sources 451 is mounted spaced apart from each other at a predetermined interval along a length of the circuit board 452. In an exemplary embodiment, the plurality of light sources 451 may be mounted on the circuit board 452 by a surface mount technology ("SMT") but is not limited thereto.

The circuit board 452 includes a power wiring layer 452*c* on which a metal wiring (not illustrated) is disposed or formed, an insulating layer 452*b*, and a circuit board base 452*a*. The circuit board base 452*a* is configured to support the power wiring layer 452*c*, the insulating layer 452*b*, and other components to be mounted thereon and dissipates heat generated from the plurality of triangular light sources 451 to be released toward a lower surface thereof.

The circuit board base 452*a* body may include or be formed of metal having relatively high thermal conductivity, such as aluminum (Al) and copper (Cu). Further, a heat-transmitting material may be coated on the circuit board base 452*a* body so as to enhance the heat dissipation function thereof.

In addition, a heat dissipation panel (not illustrated), such as a heat sink, may be provided on a rear surface of the circuit board base 452*a* so as to receive heat generated from the respective triangular light sources 451 and dissipate the heat externally more efficiently.

The power wiring layer 452*c* including a plurality of metal wirings (not illustrated) that includes or is formed of a patterned conductive material being is disposed above the circuit board base 452*a*. The insulating layer 452*b* is disposed between the circuit board base 452*a* and the power wiring layer 452*c* to electrically insulate the circuit board base 452*a* from the metal wiring (not illustrated) of the power wiring layer 452*c*.

On the circuit board 452, the plurality of light sources 451 are arranged in a series while being spaced apart from each other at a predetermined distance. To arrange the plurality of light sources 451 in series, the metal wiring (not illustrated) of the power wiring layer 452*c* on the circuit board 452 and a pair of a positive-polarity electrode lead 458*a* and a negative-polarity electrode lead 458*b* of the light source 451 are electrically connected.

In this regard, a pair of the positive-polarity electrode lead 458*a* and the negative-polarity electrode lead 458*b* respectively provided in adjacent light sources 451 are disposed not to contact one another, and a driving power (+) and a ground power (−) are applied to the respective light sources 451 through the the positive-polarity electrode lead 458*a* and the negative-polarity electrode lead 458*b*, respectively, such that the respective light sources 451 may generate and emit light.

In the light source 451, a light emitting chip 453 configured to emit light is mounted on a heat dissipation slug 455. The heat dissipation slug 455 which includes or is formed of metal, is a member that may conductively release a relatively high-temperature heat generated at the time of light emission in the light emitting chip 453.

The heat dissipation slug 455 is enclosed by a case 457, which functions as a housing. In the case 457, one pair of the positive-polarity electrode lead 458*a* and the negative-polarity electrode lead 458*b* is electrically connected to the light emitting chip 453 through a wire 456 or the like. The light emitting chip 453 and the wire 456 are exposed outwardly of the case 457. The case 457 may define an opening thereof through which elements within the case 457 are outwardly exposed.

Herein, the one pair of the positive-polarity electrode lead 458*a* and the negative-polarity electrode lead 458*b* are exposed outside a first edge surface 457*a* of the case 457, and the exposed one pair of the positive-polarity electrode lead 458*a* and the negative-polarity electrode lead 458*b* are electrically connected to the power wiring (not illustrated) formed on the circuit board 452 to receive the driving power (+) and the ground power (−) for light emission of the light emitting chip 453.

In this regard, the case 457 has a triangular cross-section in a direction perpendicular to a length direction of the circuit board 452, and includes a first edge surface 457*a* through which the one pair of the positive-polarity electrode lead 458*a* and the negative-polarity electrode lead 458*b* are exposed from the case 457 to contact the circuit board 452, a second edge surface 457*b* perpendicular to the first edge surface 457*a*, and a third edge surface 457*c* connecting the first edge surface 457*a* and the second edge surface 457*b* to each other.

Herein, the third edge surface 457*c* is disposed to be inclined between the first and second edge surfaces 457*a* and 457*b* at a predetermined angle with respect to the circuit board 452. End surfaces of the first, second and third edge surfaces 457*a*, 457*b* and 457*c* are connected to one another by fourth and fifth edge surfaces 457*d* and 457*e*.

The first and second edge surfaces 457*a* and 457*b* and the fourth and fifth edge surfaces 457*d* and 457*e* protrude upwards from the circuit board 452 along an edge of the heat dissipation slug 455 so as to provide a space which is filled with a transparent resin 454.

In this regard, the transparent resin 454 includes a phosphor (not illustrated). The phosphor (not illustrated) may be combined with a transparent epoxy resin (not illustrated) or a silicon resin (not illustrated) at a predetermined proportion to form the transparent resin 454. The transparent resin 454 may define the third edge surface 457*c*.

In other words, an accommodation space is defined above the light emitting chip 453 by the first and second edge surfaces 457*a* and 457*b* and the fourth and fifth edge surfaces 457*d* and 457*e* which are disposed to enclose the light emitting chip 453, and the transparent resin 454 is filled in the accommodation space to control an angle of scanning light and emitting light of the light source 451. The upper ends of the first, second, fourth and fifth edge surfaces 457*a*, 457*b*, 457*d* and 457*e* along with the third edge surface 457*c* may collectively define the first inclined surface 451*a*.

Herein, inner surfaces of the first and second edge surfaces 457*a* and 457*b* and the fourth and fifth edge surfaces 457*d* and 457*e* form a reflective surface (not illustrated), and the third edge surface 457*c* may be transparent.

Accordingly, the light emitted from the light emitting chip 453 is externally emitted through the third edge surface 457*c* that is transparent, and thus the third edge surface 457*c* may serve as a lens of the triangular light source 451.

In reference to FIGS. 8, 11 and 12, the light guide plate 420 has a second inclined surface 422. The second inclined surface 422, as illustrated in FIG. 11, may protrude from a light incidence side surface of the light guide plate 420 and may be provided in plural along a length of the light incidence side surface. The respective second inclined surfaces 422 are spaced apart from each other to face the light source 451. In an alternative exemplary embodiment, a second single inclined surface 423, as illustrated in FIG. 12, may protrude from an entire portion of the light incidence side surface of the light guide plate 420. The light guide plate 420 may define the light incidence side surface thereof and a portion of the light guide plate 420 extended from the light incidence surface thereof defines the second inclined surfaces 422 and 423.

The first inclined surface 451*a* of the light source 451 and the second inclined surface 422 of the light guide plate 420 face each other, and the first inclined surface 451*a* is disposed on the second inclined surface 422 in a thickness direction of the light guide plate 420. Accordingly, as the first inclined surface 451*a* of the light source 451 contacts the second inclined surface 422 of the light guide plate 420, the light source 451 may be accurately aligned corresponding to the light incidence side surface of the light guide plate 420.

In previous embodiments, the alignment member is disposed as an element separate from the light source and the light guide plate, and fixed to at least one of the the circuit board and the light guide plate. In contrast, the light source 451 and/or the light guide plate 420 in the embodiments of FIGS. 8, 9, 10, 11 and 12 may define the alignment member.

For the light source 451, the triangular shaped case 457 of the light source 451 fixed to the circuit board 452 in of FIGS. 8, 9, 10, 11 and 12 may define the alignment member. For the light guide plate 420, the protruded portions 422 and 423 fixed to the light guide plate 420 in of FIGS. 8, 9, 10, 11 and 12 may define the alignment member. That is, the light source 451 and the light guide plate 420 in FIGS. 8, 9, 10, 11 and 12 may individually or collectively define the alignment member.

As set forth above, in one or more exemplary embodiments of the display device according to the invention, the light incidence efficiency of the light guide plate may be enhanced, light leakage occurring at an edge portion of the display device may be significantly reduced, power consumption may decrease, and manufacturing costs may be reduced.

From the foregoing, it will be appreciated that various embodiments in accordance with the present disclosure have been described herein for purposes of illustration, and that various modifications may be made without departing from the scope and spirit of the present teachings. Accordingly, the various embodiments disclosed herein are not intended to be limiting of the true scope and spirit of the present teachings. Various features of the above described and other embodiments can be mixed and matched in any manner, to produce further embodiments consistent with the invention.

What is claimed is:

1. A display device comprising:
   a display panel which displays an image with light and has a curvature;
   a light source which generates and emits the light to the display panel;
   a light guide plate which guides the light emitted from the light source to the display panel, the light guide plate having a curvature and defining a light incidence surface thereof through which the light is incident;
   a circuit board which faces the light incidence surface of the light guide plate and on which the light source is mounted; and
   an alignment member which is between the circuit board and the light guide plate and aligns the light source with the light incidence surface of the light guide plate,
   wherein the alignment member extends from the circuit board and contacts an upper surface of the light guide plate.

2. The display device of claim 1, wherein
   the light source is provided in plural, and
   the alignment member is disposed between adjacent light sources.

3. The display device of claim 2, wherein a position of the alignment member with respect to the light incidence surface of the light guide plate is fixed by attachment of the alignment member to at least one of the circuit board and the light guide plate.

4. The display device of claim 3, wherein in a direction from the circuit board to the light incidence surface of the light guide plate, a thickness of the alignment member is greater than a thickness of the light source.

5. The display device of claim 1, wherein in a thickness direction of the light guide plate, a height of the light source is substantially the same as a thickness of the light guide plate.

6. The display device of claim 5, wherein within the display device, the light source is disposed coplanar with the light guide plate.

7. The display device of claim 1, further comprising a lower frame on which the light source, the circuit board and the light guide plate are disposed.

8. A display device comprising:
- a display panel which display an image with light and has a curvature;
- a light source which generates and emits the light to the display panel;
- a light guide plate which guides the light emitted from the light source to the display panel, the light guide plate having a curvature and defining:
  - a light incidence surface thereof through which the light is incident, and
  - a coupling groove thereof recessed from the light incidence surface;
- a circuit board which faces the light incidence surface of the light guide plate and on which the light source is mounted; and
- an alignment member which is between the circuit board and the light guide plate and aligns the light source with the light incidence surface of the light guide plate,
- wherein the alignment member extends from the circuit board and into the coupling groove recessed from the light incidence surface of the light guide plate.

9. The display device of claim 8, wherein
the light source is provided in plural, and
the alignment member is disposed between adjacent light sources.

10. The display device of claim 9, wherein a position of the alignment member with respect to the light incident surface of the light guide plate is fixed by attachment of the alignment member to at least one of the circuit board and the light guide plate.

11. The display device of claim 8, wherein in a thickness direction of the light guide plate, a height of the light source is substantially the same as a thickness of the light guide plate.

12. The display device of claim 11, wherein within the display device the light source is coplanar with the light guide plate.

13. The display device of claim 8, further comprising a lower frame on which the light source, the circuit board and the light guide plate are disposed.

14. A display device comprising:
- a display panel which displays an image with light and has a curvature;
- a light source which generates and emits the light to the display panel, the light source defining a first inclined surface thereof;
- a light guide plate which guides the light emitted from the light source to the display panel, the light guide plate having a curvature and defining a light incidence surface thereof through which the light is incident and from which a portion thereof extends toward the light source, the extended portion defining a second inclined surface of the light guide plate;
- a circuit board which faces the light incidence surface of the light guide plate and on which the light source is mounted; and
- an alignment member which is between the circuit board and the light guide plate and aligns the light source with the light incidence surface of the light guide plate,
- wherein the first inclined surface defined by the light source and the second inclined surface defined by the light guide plate face each other to define the alignment member.

15. The display device of claim 14, wherein in a thickness direction of the light guide plate, the first inclined surface is disposed on the second inclined surface.

16. The display device of claim 15, wherein the first inclined surface disposed on the second inclined surface contacts the second inclined surface.

17. The display device of claim 14, wherein in a thickness direction of the light guide plate, a height of the light source is substantially the same as a thickness of the light guide plate.

18. The display device of claim 17, wherein within the display device, the light source is coplanar with the light guide plate.

19. The display device of claim 14, further comprising a lower frame on which the light source, the circuit board and the light guide plate are disposed.

20. The display device of claim 14, wherein the circuit board has a curvature and a length of the circuit board is disposed along a curved side of the light guide plate.

* * * * *